Dec. 20, 1966  H. BRAUER  3,292,409
HYDRAULICALLY OPERATED DRAW BENCH
Filed July 13, 1964  8 Sheets-Sheet 1

INVENTOR
Hans Brauer

Dec. 20, 1966  H. BRAUER  3,292,409
HYDRAULICALLY OPERATED DRAW BENCH

Filed July 13, 1964  8 Sheets-Sheet 6

INVENTOR
Hans Brauer
by
Michael S. Striker
Attorney

FIG.10b

United States Patent Office 3,292,409
Patented Dec. 20, 1966

3,292,409
HYDRAULICALLY OPERATED DRAW BENCH
Hans Brauer, Solingen, Germany, assignor to Th. Kieserling & Albrecht, Solingen, Germany
Filed July 13, 1964, Ser. No. 382,991
Claims priority, application Germany, July 13, 1963,
K 50,216
6 Claims. (Cl. 72—290)

The present invention relates to drawing benches.

Drawing benches are used to draw elongated workpieces through dies so as to give the workpieces predetermined cross-sectional configurations and dimensions. Such drawing benches may be operated hydraulically but often require an extremely large amount of space and such heavy components that special measures must be taken to support the structure so that, for example, cylinders will not be injured by extremely heavy pistons which move therein.

It is accordingly one of the objects of the present invention to provide a hydraulic drawing bench capable of reliably supporting elements which need not be made of very great dimensions in order to advance the work material through the drawing die.

Another object of the present invention is to provide a structure where the parts which provide the power for drawing the work through the die does not directly participate in the gripping of the work.

In addition, it is an object of the invention to provide a pair of units which are capable of alternately operating but continue the advance of the work in the drawing direction while returning each of the elements which operate alternately to a position where it is ready to take over the operations on the end of the movement provided by the other of these elements.

In addition it is an object of the invention to provide an exceedingly simple mechanical and hydraulic assembly which is capable of achieving the objects of the invention.

Furthermore, it is an object of the invention to provide a structure capable of very rapidly returning the work-advancing means back to its starting position after a drawing operation has been completed.

With these objects in view the invention includes, in a drawing bench, an elongated guide means and a pair of end carriages spaced from each other along this guide means and supported thereby for movement therealong. At least one elongated piston extends between the pair of carriages and is fixed thereto. A pair of cylinder means are also spaced from each other along the guide means, and this pair of cylinder means is situated between the pair of end carriages. The piston extends through the pair of cylinder means and a pair of clamping means are respectively connected operatively to the pair of cylinder means for alternately clamping the latter to the guide means, so that when one of the cylinder means is clamped to the guide means a hydraulic means can co-operate therewith for advancing the piston with respect to this one cylinder means in the drawing direction, and after the piston has advanced to a given distance in the drawing direction the other cylinder means is clamped to the guide means and the hydraulic means continues the advance of the piston, and the carriages therewith, in the drawing direction, while the first cylinder means is unclamped and advanced by the hydraulic means with respect to the piston to a position ready to again be clamped to the guide means for continuing the advance of the piston, so that in this way two cylinder means co-operate with the piston means extending therethrough for substantially continuously advancing the structure in the drawing direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
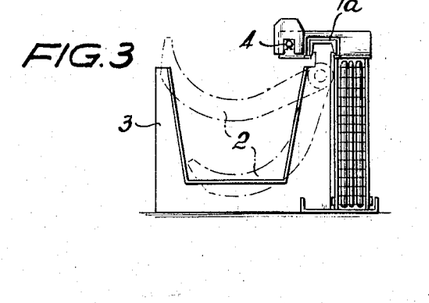
FIG. 3 is an end view of the structure of FIGS. 1 and 2, on an enlarged scale as compared to FIGS. 1 and 2.

Referring to FIG. 3, it will be seen that the drawing bench 1 is quite inexpensive inasmuch as it includes essentially only a single U-shaped beam 1a which forms a guide means along which the parts described below are guided for movement in the drawing direction. This guide means 1a is supported by a plurality of standards 3 which also serve to support the elements 2 shown in dot-dash lines in FIG. 3, in a schematic manner, and capable of receiving the work 4 after the latter has been drawn, the receiving arms 2 gradually lowering as more of the workpieces are received thereby.

Figure 1:
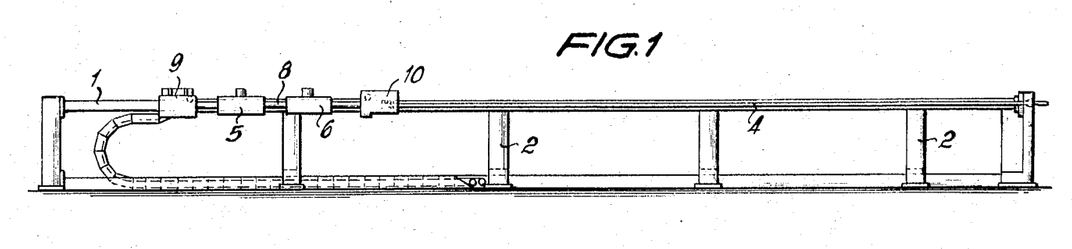
FIG. 1 is a schematic side elevation of a drawing bench according to the invention.
Figure 2:
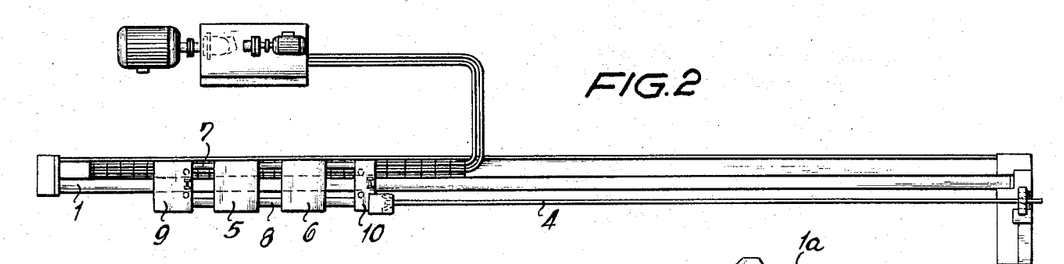
FIG. 2 is a top plan view of the structure of FIG. 1.
Figure 6A:
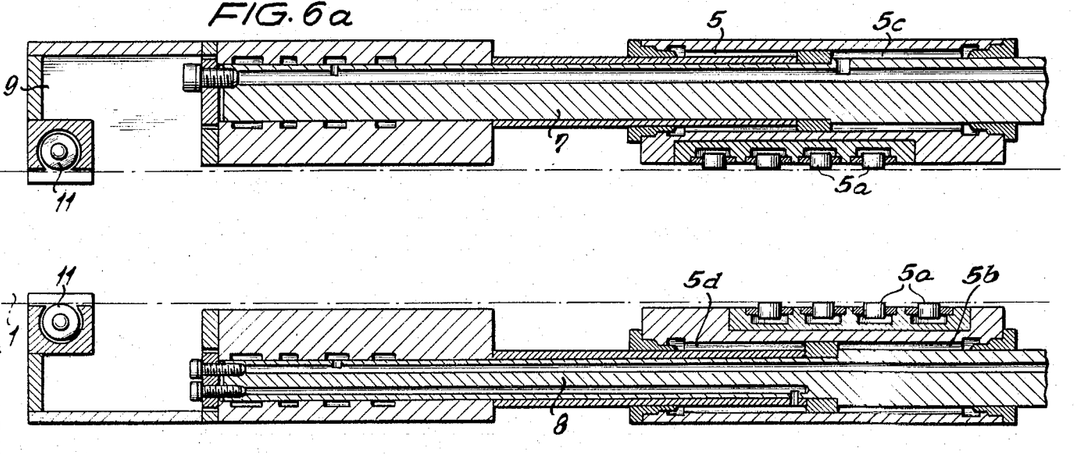
FIGS. 6a and 6b are section plan views taken along the lines VIa—VIa and VIb—VIb of FIGS. 4a and 4b, respectively, in the directions of the arrows.
Figure 7:
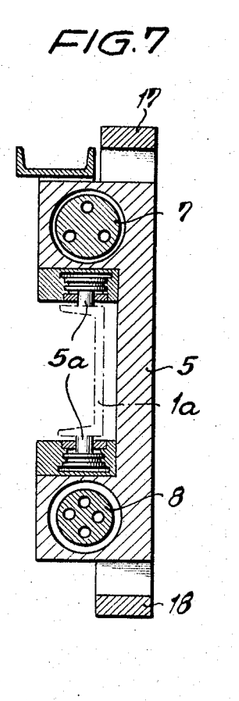
FIG. 7 is a transverse section taken along the line VII—VII of FIG. 5a in the direction of the arrows, the structure being turned in FIG. 7 in a clockwise direction through 90° for the sake of better utilizing the space on the drawing sheet.
Figure 8:
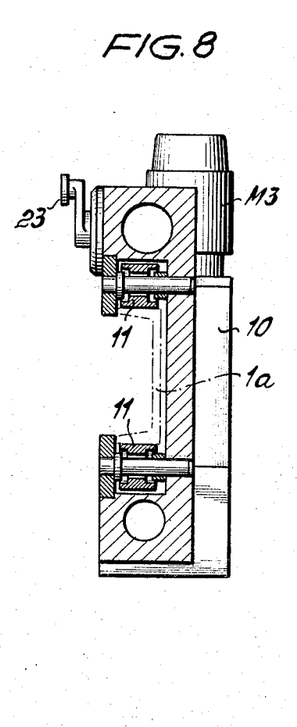
FIG. 8 is a transverse section taken along the line VIII—VIII of FIG. 5b in the direction of the arrows, FIG. 8 also being turned to an orientation better utilizing the available space of the drawing sheet.

The structure which serves to advance the work in the drawing direction includes a pair of alternately operable cylinder means 5 and 6 shown schematically in FIGS. 1 and 2 as well as a pair of pistons 7 and 8 located beside each other and each extending through the pair of cylinder means 5 and 6. The pair of cylinder means 5 and 6 are spaced from each other along the guide means 1a and are supported thereby therealong. Actually each cylinder means 5 and 6 extends around the guide means 1a without engaging the latter, as is apparent from FIG. 7 where the U-shaped guide means 1a is shown in dot-dash lines. The pistons 7 and 8 extend through and actually support the pair of cylinder means 5 and 6 with respect to the guide means 1a in the position relative thereto which is shown in FIG. 7 for the cylinder means 5, the cylinder means 6 having the same relationship with respect to the guide means 1a as the cylinder means 5. Each of the elongated pistons 7 and 8 is fixed at its opposite ends to a pair of end carriages 9 and 10, and these carriages carry rollers 12 which ride on the upper surface of the guide means 1a and rollers 11 which ride along the side surfaces of the guide means 1a, as indicated most clearly for the carriage 10 in FIG. 8. Also, FIGS. 6a and 6b show the manner in which the rollers 11 engage the drawing bench 1 which is shown in dot-dash lines in FIGS. 6a and 6b, and the rollers 12 are shown in dotted lines in FIGS. 4a and 4b engaging the top surface of the bench which is shown also in dot-dash lines in FIGS. 4a and 4b.

Figure 4A:
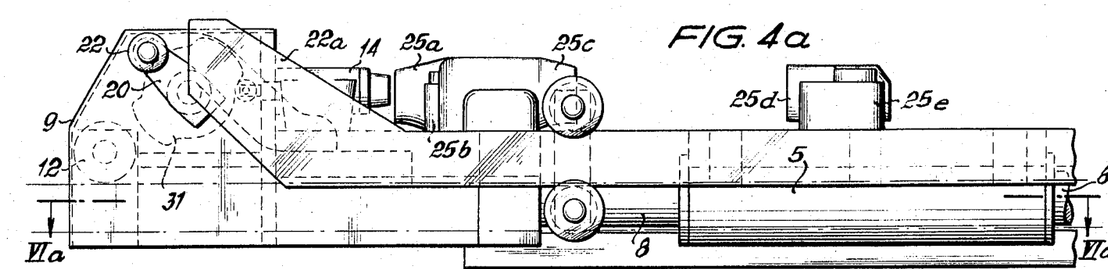
FIGS. 4a and 4b show on an enlarged scale and in a side elevation a structure for advancing the work material in the drawing direction, FIGS. 4a and 4b forming a continuation of each other.
Figure 4B:
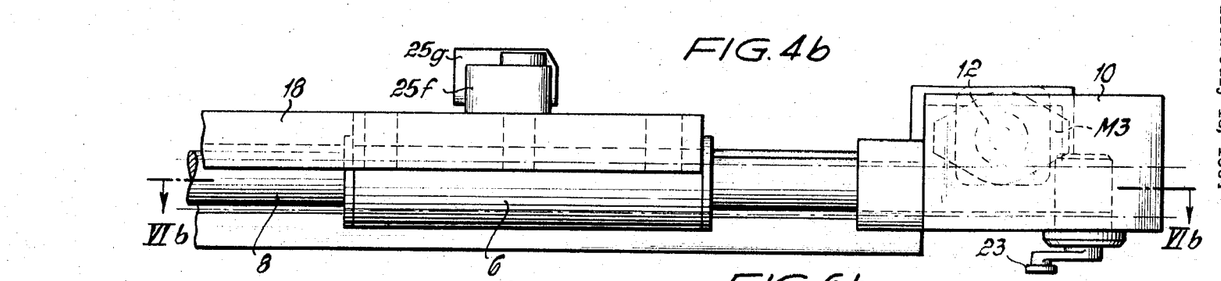
Figure 6B:
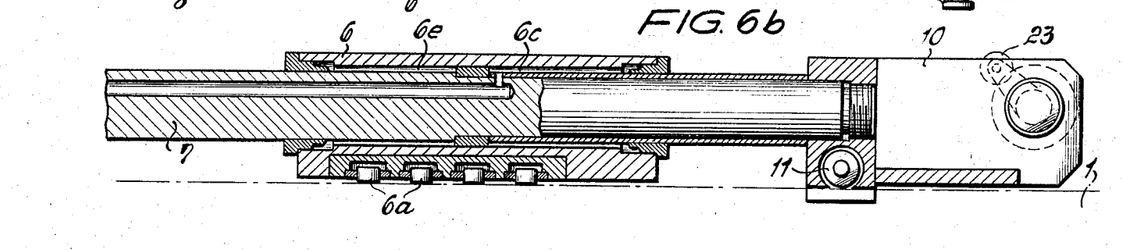

The carriage 10 is nearest to the work 4 which is drawn through a die shown schematically at the right ends of FIGS. 1 and 2, and this carriage 10 fixedly carries at its right end, as shown in FIGS. 4b and 6b, a gripping means 13 of a known construction for gripping the end of the work so as to advance the work to the left, as viewed in FIGS. 1 and 2, during the drawing operations.

Each of the cylinder means has a clamping means carried thereby for clamping each cylinder means, to the drawing bench 1, and the clamping means takes the form of a plurality of pistons 5a carried by the cylinder means 5 and a plurality of pistons 6a carried by the cylinder means 6, these pistons all being guided in suitable cylinders and communicating with a hydraulic fluid under pressure so that when the fluid under pressure is applied against these clamping pistons they will advance up to and forcefully press against the side surfaces of the guide means 1a for clamping the cylinder means thereto, as is clearly shown for the cylinder means 5 in FIG. 7. The pressure chambers for the clamping pistons 5a and 6a communicate wtih the fluid pressure chambers 5b, 6b, and 5c, 6c which are respectively situated around the pair of pistons 8 and 7, as shown most clearly in FIGS. 6a and 6b. Thus, in accordance with one feature of the invention the hydraulic fluid which is used to advance the pistons relative to the cylinders is also used to clamp one of the cylinder means at any given time to the guide means 1a.

As is particularly apparent from FIGS. 6a and 6b, the effective area of the piston 7 in the pair of cylinder means 5 and 6 is smaller than the effective area of the piston 8 in the pair of cylinder means so that the alternate free movement of the pair of cylinder means relative to the pistons can be quickly carried out while at the same time a small amount of hydraulic liquid, such as oil, is required for advancing the pistons during drawing of the work.

Figure 5A:
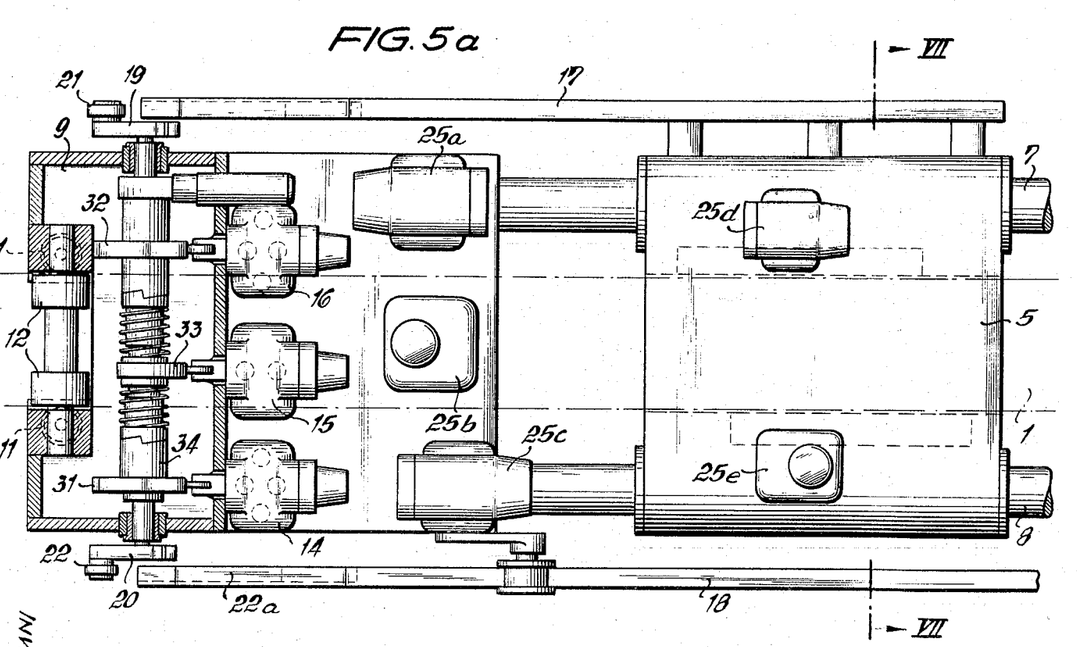
FIGS. 5a and 5b are respective top plan views of FIGS. 4a and 4b and also are continuations of each other, the left end of FIG. 5a being show in section to more clearly illustrate the structure.
Figure 5B:
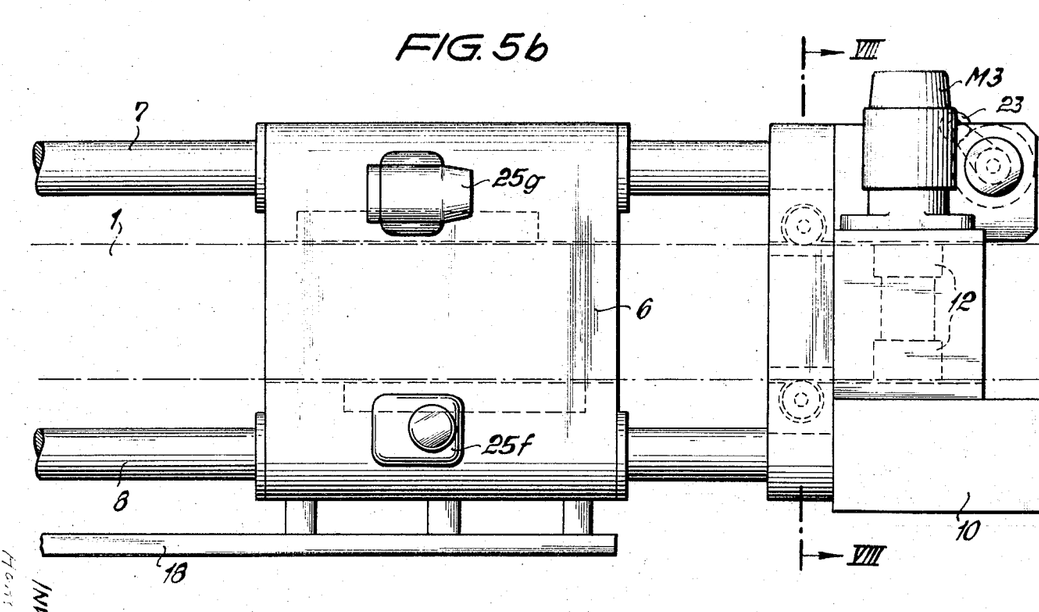

The cylinder means 5 fixedly carries an elongated cam means 17, shown fixed to the cylinder means 5 at the upper right portion of FIG. 5a, and the cylinder means 6 fixedly carries on the other side of the assembly an elongated cam means 18, shown fixed to the cylinder means 6 in FIG. 5b. The pair of cam means 17 and 18 respectively cooperate with rolls 21 and 22 carried by the free ends of levers 19 and 20 which are fixed to the ends of a rotary cam shaft carried by the end carriage 9 and carrying the cams 31–33 for the purpose described below. This carriage 9 carries the control means for the hydraulic structure and the cams 17 and 18 actuate the control means in the manner described below. The control means includes the valves 14–16 as well as the non-return valves 25a–25g, which serve to control the hydraulic pressure fluid in such a way that the pair of cylinder means 5 and 6 are alternately effective to provide a substantially continuous advance of the pistons 7 and 8 in the drawing direction together with the carriages 9 and 10 which are fixed to these pistons.

Figure 10A:
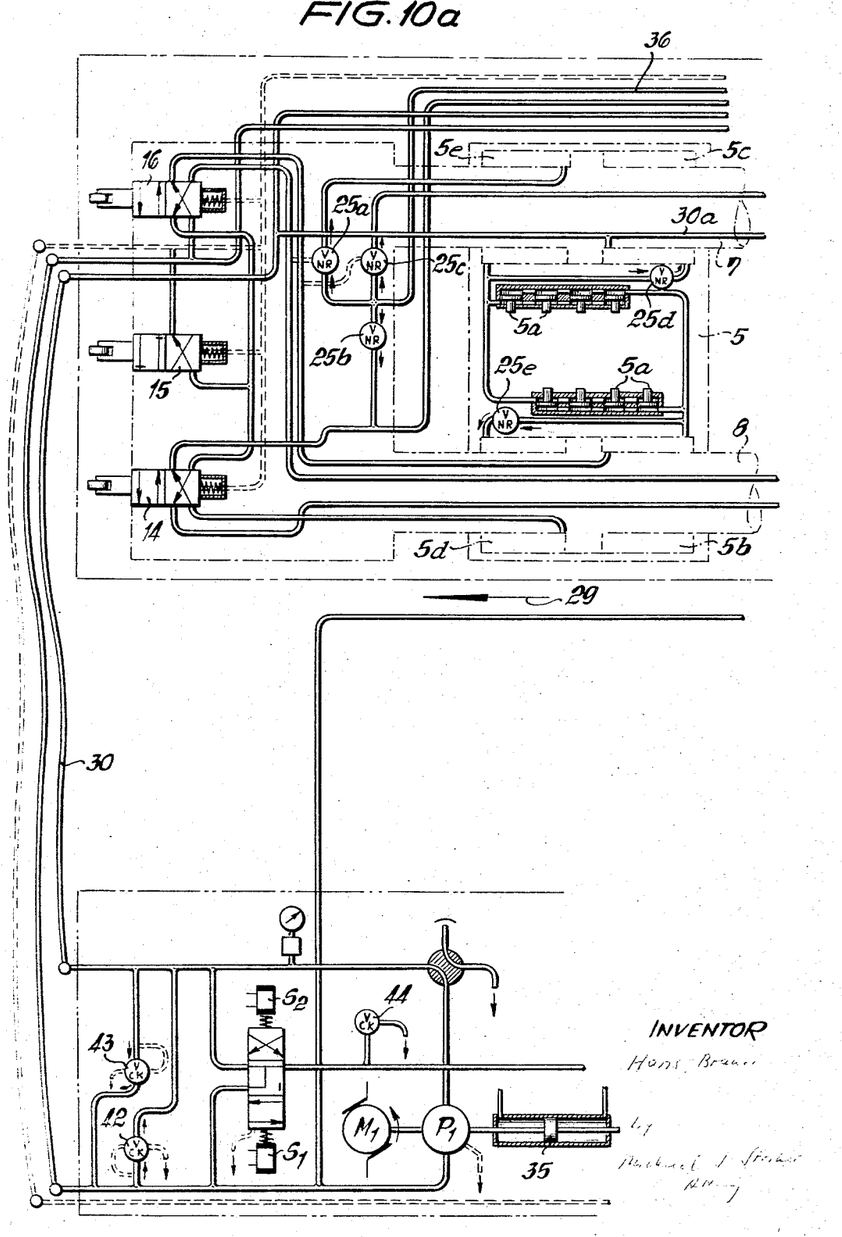
FIGS. 10a and 10b schematically illustrate the hydraulic circuit and some of the electrical structure associated therewith, FIGS. 10a and 10b forming extensions of each other.
Figure 10B:
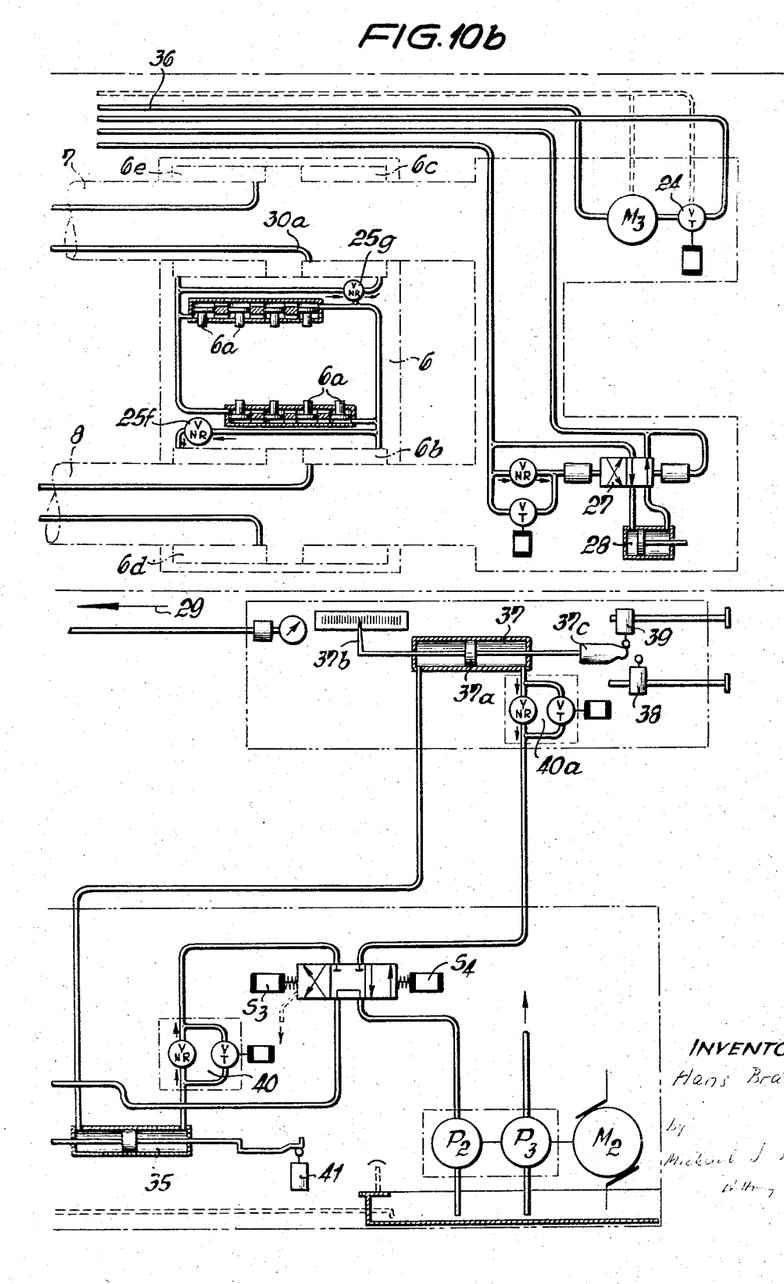

In order to provide a rapid return of the entire assembly to a given starting position the carriage 10 carries the hydraulic motor M3, also shown in FIG. 10b, and this motor drives the supporting rollers 12 of the carriage 10 for the purpose of returning the structure to the starting position. A roller 23 carried by the carriage 10 actuates through an unillustrated stop a throttling valve 24 (FIG. 10b) so that the return speed of the assembly just before it reaches its starting position can be reduced by throttling the supply of oil so that a smooth gradual stopping of the return movement can be brought about.

The above-described structure operates as follows:

The drawing operations include essentially four different types of operations as follows:

(1) The alternating current motor M1 shown at the lower part of FIG. 10a continuously drives the steplessly adjustable oil pump P1, and a suitable switch can be closed by the operator to energize the electromagnets S1 and S3 respectively shown at the lower portions of FIGS. 10a and 10b, so as to start the drawing operation.

Initially the work gripping structure grips the work as a result of the action of the valve 27 and the piston 28 which in accordance with the flow of pressure fluid controlled by the valve 27 actuates the gripping device 13 so as to grip the work. Elements 27 and 28 are shown schematically at the right portion of FIG. 10b. In the position of the parts shown in FIGS. 6a, 6b and 10a, 10b the oil under pressure is directed by the control valve 16 into the pressure chamber 5b which surrounds the piston 8, so that the clamping pistons 5a are actuated by clamping the cylinder means 5 to the drawing bench 1, and thus the cylinder means 5 at this time cannot move with respect to the drawing bench. In this way the force of the fluid under pressure is directed to the piston 8 for advancing the latter in the direction of the arrow 29, which is the drawing direction.

(1) The fluid under pressure which is displaced out of the chamber 5d flows through the valve 14 and the non-return valves 25b and 25c, shown in FIG. 10a, into the pressure chamber 6e. In this way, the carriage 6 also is advanced in the direction of arrow 29, but it will be noted that this chamber 6e surrounds the piston 7 which has the smaller effective area so that the cylinder means 6, whose clamps 6a are inoperative at this time, advances at almost double the speed of the pistons, in the direction of the arrow 29. The oil displaced out of the pressure chamber 6c flows through the conduits 30a and 30 back to the pump P1. During this phase of the operation when the cylinder means 5 is stationary the oil which is displaced out of the chamber 5e of the cylinder means 5, this chamber surrounding the piston 7, flows through the non-return valve 25d into the pressure chamber 5c. At the same time, the oil displaced out of the pressure chamber 6d flows through the valves 14 and 16 into the pressure chamber 6b.

(2) At the second phase of the operations, the cylinder means 6, as soon as it has completed its free movement relative to the pair of pistons in the direction of the arrow 29 places the cam 18 at its camming portion 22a in engagement with the roller 22 to turn the latter and the lever 20 therewith through 90° in a counterclockwise direction, as viewed in FIG. 4a, so that the cam 31 turns to actuate the valve 14. The oil which has been displaced out of the chamber 5d during the advance of the piston 8 is then delivered by the valves 14 and 16 into the pressure chamber 6b. At the same time this oil also reaches the pressure chamber for the clamping pistons 6a so that these now clamp the cylinder means 6 to the drawing bench 1. Now the clamps 5a are released and the movement of the pistons in the drawing direction is continued by the oil under pressure which acts through the now stationary cylinder means 6 on the piston 8. The fluid which is displaced at this time out of the pressure chamber 6d which surrounds the piston 8 flows through the control valve 14 and the non-return valves 25b, 25a and 25c into the pressure chambers 5e and 6e and from the latter through the non-return valves 25d and 25g into the pressure chambers 5c and 6c from where the oil returns through the conduits 30a and 30 back to the pump.

(3) The third phase of the operations involves the return of the roller 22 in a clockwise direction back to its initial position as the piston 8 and the end carriages 9 and 10 advance in the direction of the arrow 29 with respect to the stationary sonar means 6, so that the roller 22 moves beyond the cam 18, and now the cam 32 actuates the valve 16 during the clockwise return movement of the roller 22. In this way the fluid flows from the pump P1 through the valve 16 directly to the pressure chamber 6b. The oil which is displaced out of the chamber 6d flows through the valve 14 and the non-return valves 25b and 25a into the pressure chamber 5e which surrounds the piston 7, so that now it is the cylinder means 5 which is rapidly advanced in the drawing direction back to its initial position relative to the pistons, in much the same way that the cylinder means 6 was previously advanced to its initial position relative to the pistons. The oil which is displaced out of the pressure chamber 5c at this time flows back to the pump through the conduits 30a and 30. The oil which is simultaneously displaced out of the pressure chamber 5b which surrounds the piston 8 flows through the control valves 16 and 14 back into the chamber 5d. Also, the oil which is displaced out of the pressure chamber 6e flows through the non-return valve 25g back into the pressure chamber 6c.

(4) As soon as the cylinder means 5 has completed its free movement relative to the pistons, the cam 17 which is fixed to the cylinder means 5 engages the roller 21 so as to turn the latter in a clockwise direction and thus the cam 31 is now turned through 90° in a clockwise direction to place the valve 14 in such a position that the oil displaced out of the pressure chamber 6d flows through the control valves 14 and 16 into the pressure chamber 5b and thus simultaneously into the pressure chambers for clamping pistons 5a, so that in this way the cylinder means 5 is now clamped to the drawing bench 1 and also contributes to the advance of the pistons.

The oil which is displaced out of the pressure chamber 5d during the advance of the piston 8 at this time flows through the valve 14 and the non-return valves 25b, 25a and 25c into the pressure chambers 5e and 6e and is then directed through the non-return valves 25d and 25g as well as the conduits 30a and 30 back to the pump P1.

As soon as the cylinder means 5 has transmitted the tension force to the piston 8, the carriage 9 advances in the direction of the arrow 29 away from the cylinder means 5 so that the roller 21 returns in a clockwise direction during its movement with respect to the cam 17, and thus the cam 31 is also returned in the same direction through 90° so as to release the valve 14. The alternate ments of the pair of cylinder means 5 and 6 and the resulting continuous displacement of the pistons and end carriages so as to continuously draw the work through the die continues in the above described manner.

The intermediate cam 33 which is carried by the cam shaft 34, fixedly mounted thereon, serves, during each turning of the cam shaft by the rollers 21 and 22 to actuate the valve 15 in such a way that the pressure in the chambers 5b and 6b and thus the pressure acting on the clamping pistons 5a and 6a is released so that the clamping movements of the clamping pistons is terminated, and of course this operation takes place alternately for the clamping pistons 5a and the clamping pistons 6a to provide alternating clamping of the cylinder means 5 and cylinder means 6 to the bench as described above.

When a drawing operation is completed, the entire drawing assembly will have advanced along the guide means 1a from a predetermined starting position to a given end position, and at this time the electromagnet S4 is energized so as to discontinue the supply of oil from the pump P1. When the output of the pump P1 is terminated the magnet S4 is deenergized by the limit switch 41 shown at the lower part of FIG. 10b. This control of the magnet S4 can, for example, be carried out by sensing the end of the drawing operation with a photocell which senses when the end of the work has passed through the die. Moreover, after the drawing operation ends the pump P1 is so controlled by the piston drive 35, that now the pressure fluid flows through the conduits 30 and 30a into the pressure chambers 5c and 6c and through the non-return valves 25d and 25g into the pressure chambers 5e and 6e from where the oil flows through the non-return valves 25a and 25c and the conduit 35 to the oil motor M3. This motor is operatively connected to the roller 12 of the carriage 10 so as to drive the latter, as indicated at the right portion of FIG. 5b, and thus at this time the entire assembly of carriages, pistons, and cylinder means is rapidly returned to its starting position in front of the drawing die.

The alternating current motor M2, shown at the lower part of FIG. 10b serves to continuously drive the auxiliary pumps P2 and P3. The auxiliary pump P2 supplies pressure fluid for controlling the piston drive 35 and also serves as a supply pump for the fluid circuit of the pump P1. The pump P3 serves to provide pressure fluid for auxiliary units of the drawing bench.

The piston drive 37 is connected in series with the piston drive 35, and the piston 37a carries a pointer 37b and a limit-switch cam 37c, as shown at the center right portion of FIG. 10b. The pointer 37b indicates the drawing speed to the operator, since the positions of the pistons 35 and 37a indicate the adjustment of the pump P1, this pump being adjusted to supply different amounts of fluid and therefore to provide different drawing speeds. The pump P1 is angularly turned in order to vary the delivery rate of pressure fluid, and this angular turning is controlled by the piston drive 35 and is thus indicative of the drawing speed. The limit-switch cam 37c actuates the pair of limit switches 38 and 39 which are adjustable. These limit switches 38 and 39 serve to deenergize the electromagnet S3 as soon as a given drawing speed is achieved.

Through an unillustrated time relay the magnet S3 is again energized, so that the pump P1 is again angularly turned in a direction which accelerates the drawing carriages up to a preselected drawing speed. The throttle valves 40 and 40a are provided so as to control the acceleration during drawing and during the return of the structure to the starting position. The valves 42, 43 and 44 are safety valves which limit the extent to which the pressure of the oil can rise.

Figure 9:
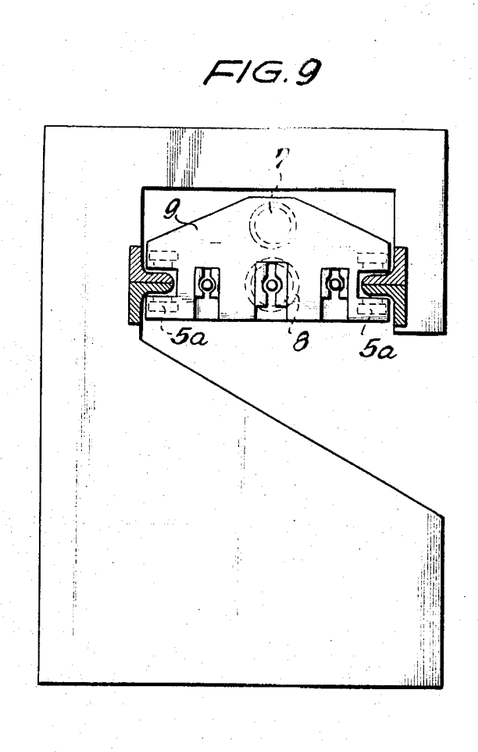
FIG. 9 is a schematic transverse illustration of another embodiment capable of carrying out the drawing operations in three stages.

The structure shown in FIG. 9 will operate in the manner described above. It will be noted that in this embodiment the pistons 7 and 8 are arranged one above the other, and the clamping pistons operate vertically rather than laterally so as to clamp the cylinders with respect to the substantially T-shaped guides shown in the embodiment of FIG. 9. With this embodiment it is possible to simultaneously draw three lengths of work through three drawing dies of different diameters so that the drawing operations can be carried out in three passes of the work through the die, and of course three different workpieces can be simultaneously drawn through the three dies of different sizes with the work received from the smallest die being completed and the work from the next larger dies being placed in the next following smaller dies for the subsequent operation, as is well known.

It will be understood that each of the elements described above, or two or more together, may also find a useful application in other types of drawing benches differing from the types described above.

While the invention has been illustrated and described as embodied in hydraulic drawing benches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a drawing bench, in combination, elongated guide means; a pair of end carriages spaced from each other along said guide means and supported thereby for movement therealong, one of said end carriages being adapted to grip the work which is to be drawn; at least one elongated piston extending between and fixed at its ends to said end carriages; a pair of cylinder means spaced from each other along said guide means and also supported thereby for movement therealong, said pair of cylinder means being situated between said end carriages and said piston extending through both of said cylinder means; hydraulic clamping means carried by each of said cylinder means for clamping said guide means when said hydraulic clamping means is actuated to prevent movement of the cylinder means along said guide means; and hydraulic means operatively connected to said cylinder means and said pair of clamping means respectively connected thereto for actuating one of said clamping means to clamp the carriage to which it is connected to said guide means while displacing said piston means longitudinally through said one cylinder means in a drawing direction advancing both of the end carriage means in said drawing direction while simultaneously advancing the other cylinder means with respect to said piston in said drawing direction, and then actuating the clamping means connected to said other cylinder means to clamp the latter to said guide means while releasing said clamping means of said one cylinder means for continuing the advance of said piston and said pair of end carriages in said drawing direction while advancing said one cylinder means in said drawing direction along said piston, whereby said cylinders alternately clamp said guide means to advance said piston and end carriages and move with respect to said guide means in said drawing direction along said piston for continuously advancing said piston and end carriages in said drawing direction.

2. In a drawing bench, in combination, elongated guide means; a pair of end carriages supported by said guide means for movement therealong and spaced from each other along said guide means; at least one elongated piston extending between and connected at its ends to said pair of carriages; a pair of cylinder means displaced with respect to each other along said guide means and situated between said pair of carriages, said piston extending through said pair of cylinder means; a pair of clamping means respectively connected operatively to said pair of cylinder means for clamping the latter to said guide means; means connected operatively to said pair of clamping means for alternately actuating the latter to alternately clamp and release said pair of cylinder means to and from said guide means, respectively; and hydraulic means operatively connected to said pair of cylinder means for advancing said piston and carriages in a drawing direction with respect to that one of said cylinder means which at any given instant is clamped by said clamping means thereof to said guide means and for simultaneously advancing the unclamped cylinder means in said drawing direction along said piston, whereby said pair of cylinders alternately act to provide a substantially continuous advance of said piston and carriages in said drawing direction.

3. In a drawing bench as recited in claim 2, a pair of pistons each extending through said pair of cylinder means and each connected at its ends to said pair of carriages, one of said pistons having a larger effective working area than the other.

4. In a drawing bench as recited in claim 2, said hydraulic means interconnecting, at predetermined portions of each cycle of operation, chambers at each side of said piston in each of said cylinder means with each other.

5. In a drawing bench as recited in claim 2, control means for controlling said hydraulic means, and cam means carried by said pair of cylinder means and actuating said control means for controlling said hydraulic means, said control means itself being carried by one of said end carriage.

6. In a drawing bench as recited in claim 2, said hydraulic means actuating said cylinder means alternately for continuing the advance of said piston and carriages in said drawing direction until said piston and carriages have been advanced from a predetermined starting position to a given end position; and roller means engaging said guide means and driven by said hydraulic means for rapidly returning said carriages, piston and said pair of cylinder means back to said starting position after said given end position has been reached while both of said clamping means are simultaneously inactive.

References Cited by the Examiner
UNITED STATES PATENTS

| 2,228,749 | 1/1941 | Berkebil | 72—291 |
| 2,597,623 | 5/1952 | Dies et al. | 72—287 |
| 2,728,447 | 12/1955 | Ware | 72—290 |
| 3,252,314 | 5/1966 | Winnail | 72—290 |

CHARLES W. LANHAM, *Primary Examiner.*

H. D. HOINKES, *Assistant Examiner.*